United States Patent [19]

Tsui et al.

[11] Patent Number: 4,641,986

[45] Date of Patent: Feb. 10, 1987

[54] MULTI-POSITION EYEBOLT

[75] Inventors: Gary Tsui, Rosemead; Thomas Heimbigner, Bellflower, both of Calif.

[73] Assignee: CBC Industries, Inc., Los Angeles, Calif.

[21] Appl. No.: 771,351

[22] Filed: Aug. 30, 1985

[51] Int. Cl.[4] .............................................. F16G 15/08

[52] U.S. Cl. ...................................... 403/164; 403/78; 403/119; 403/150; 24/115 K; 410/101

[58] Field of Search ......... 24/115 K, 115 H, 265 CD, 24/265 R; 410/101, 102; 403/78, 164, 119, 150; 248/361

[56] References Cited

U.S. PATENT DOCUMENTS

| | | | |
|---|---|---|---|
| 649,270 | 5/1900 | Collins | 248/59 |
| 692,841 | 2/1902 | Fenton | 40/145 |
| 1,321,356 | 11/1919 | Bateman | 403/150 X |
| 2,519,460 | 8/1950 | Hansen | 403/78 X |
| 2,688,504 | 9/1954 | Parker | 287/20.5 |
| 3,163,901 | 1/1965 | Brawand | 403/13 |
| 3,212,457 | 10/1965 | Looker | 105/369 |
| 3,214,501 | 3/1966 | Watts | 105/369 |
| 3,297,293 | 1/1967 | Andrews et al. | 24/115 K |
| 3,492,033 | 1/1970 | Mueller | 403/78 |
| 3,504,937 | 4/1970 | Panovic | 403/164 |
| 3,779,502 | 12/1973 | Marberg | 248/361 |
| 4,074,519 | 2/1978 | Garrett | 403/78 X |
| 4,308,419 | 12/1981 | Fredriksson | 403/78 X |
| 4,431,352 | 2/1984 | Andrews | 403/164 X |
| 4,570,987 | 2/1986 | Wong et al. | 403/164 |

*Primary Examiner*—Cornelius J. Husar
*Assistant Examiner*—Joseph A. Fischetti
*Attorney, Agent, or Firm*—Beehler, Pavitt, Siegemund, Jagger, Martella & Dawes

[57] ABSTRACT

For lifting loads there is provided an eyebolt with a collar swivelly mounted on a stud so as to freely rotate in a horizontal plane throughout a full 360°. A lifting ring has oppositely disposed pivot pins in swivel engagement with the collar to allow the ring to pivot in a vertical arc as well as to rotate about the stud. The stud in turn is adapted to be anchored in fixed position to the load, whatever the load may be. Enlargements at free ends of the pivot pins serve to resist pulling the pins free of the collar when a heavy lifting force is applied to the lifting ring.

7 Claims, 8 Drawing Figures

Fig. 2.
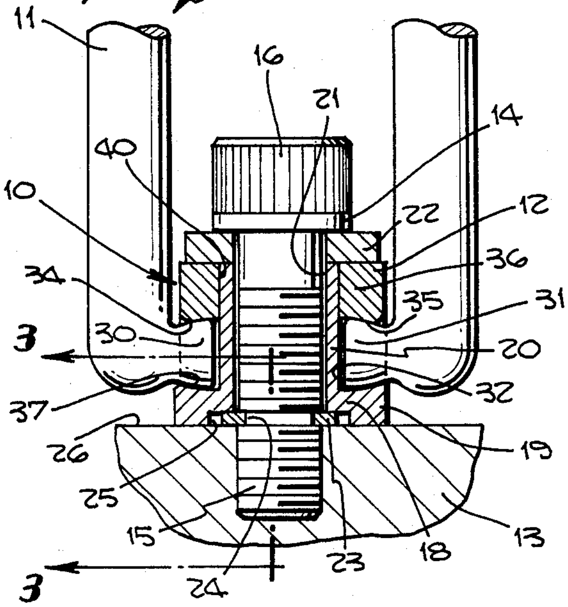
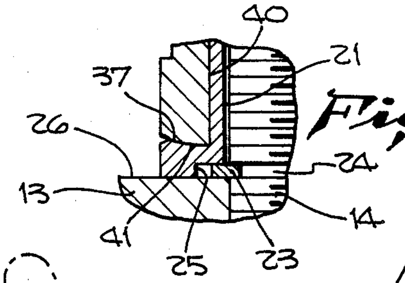
Fig. 3.
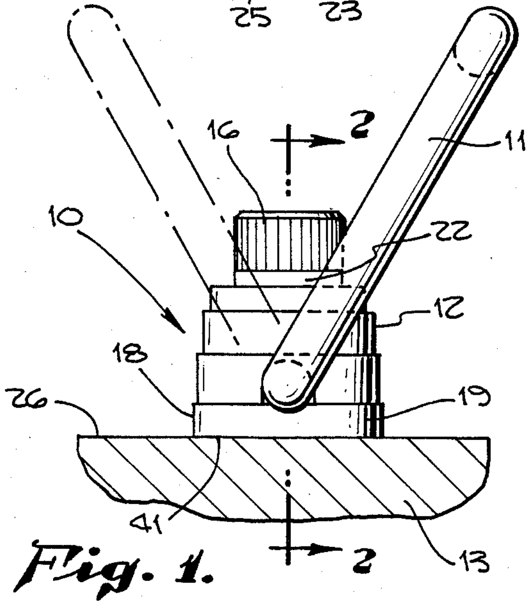
Fig. 1.
Fig. 4.
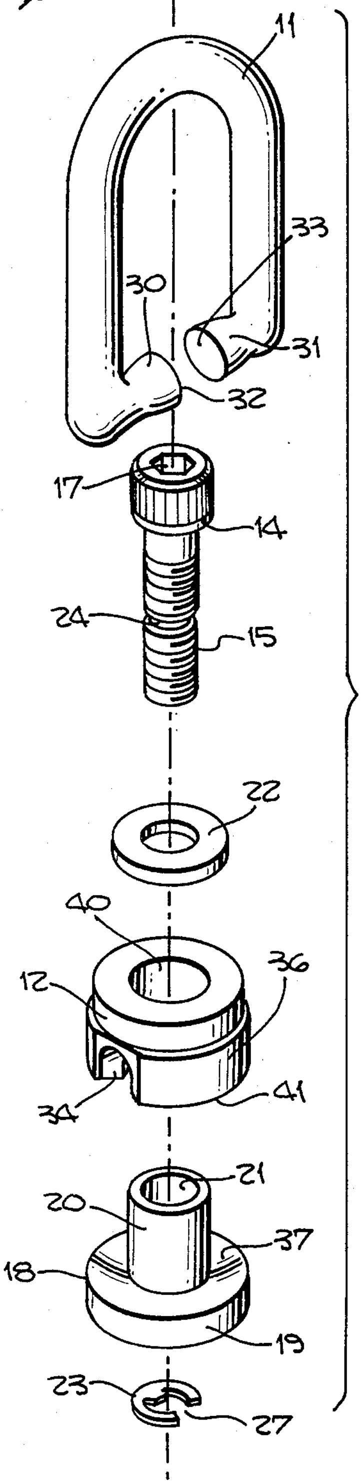

MULTI-POSITION EYEBOLT

The invention has reference to a multi-position fixture of a type adapted to be anchored to a load and used for one purpose or another such, for example, as lifting the load by use of a sling or fastening the load on the body of a truck or trailer for transportation. The multi-position fixture, moreover, is a versatile type of fixture adapted for great varieties and types of loads, relatively heavy loads in particular being advantageously served by the fixture. Contributing to the versatility of the fixture is a structure which provides a ring capable of swiveling throughout a complete 360-degree arc, and at the same time capable of being swung throughout an arc of substantially 180 degress in a direction perpendicular to the 360 degree swivel arc, irrespective of the manner in which the fixture is attached to the load.

This is an improvement on the structure of U.S. Pat. No. 3,297,293 and copending application Ser. No. 500,028, filed June 1, 1983 (now abandoned).

Among the objects of the invention is to provide a new and improved multi-position fixture for fixed attachment to a load, and which is provided with a tie ring, the ring, in company with a portion of the fixture being of a character permitting it to swing freely in different directions, depending to a degree on the direction which the tie needs to assume, and with virtually a minimum prospect of the ring being sprung free of engagement when under load.

Another object of the invention is to provide a new and improved multi-position fixture capable also by reason of its attachment of swinging throughout an arc perpendicular to the plane of rotation, the assembly of parts being relatively few in number and of rugged simple construction, making the fixture one of great dependability under a wide variety of circumstances.

Still another object of the invention is to provide a new and improved multi-position fixture having relatively few parts of rugged construction, the parts and the assembly of the same being such that the cost of production can be kept relatively low.

Still another object of the invention is to provide a new and improved multi-position fixture of a design and construction such that manufacturing operations can be held to substantially a minimum, thereby contributing appreciably not only to dependability in the assembled device but also economy.

Still further among the objects of the invention is to provide a new and improved multi-position fixture of a versatile character enabling it to be attached to any one of a great variety of loads and which is of such construction that all of the individual parts, once brought together in assembled condition, are connected together in a manner holding them in their assembled condition until permanently fastened to the load in the selected location, the parts, however, being connected in a manner such that by use of an appropriate tool they can be readily disassembled, and subsequently reassembled, should such assembly become necessary.

With these and other objects in view, the invention consists of the construction, arrangements, and combination of the various parts of the device serving as examples only of one or more embodiments of the invention, whereby the objects contemplated are attained, as hereinafter disclosed in the specification and drawings, and pointed out in the appended claims.

In the drawings:

FIG. 1 is a side elevational view of one form of the multi-position eyebolt shown mounted on a load.

FIG. 2 is a vertical sectional view on the line 2—2 of FIG. 1.

FIG. 3 is a fragmentary sectional view on the line 3—3 of FIG. 2.

FIG. 4 is an elevational exploded view of the parts of the multi-position eyebolt of FIG. 1.

Figure 5:
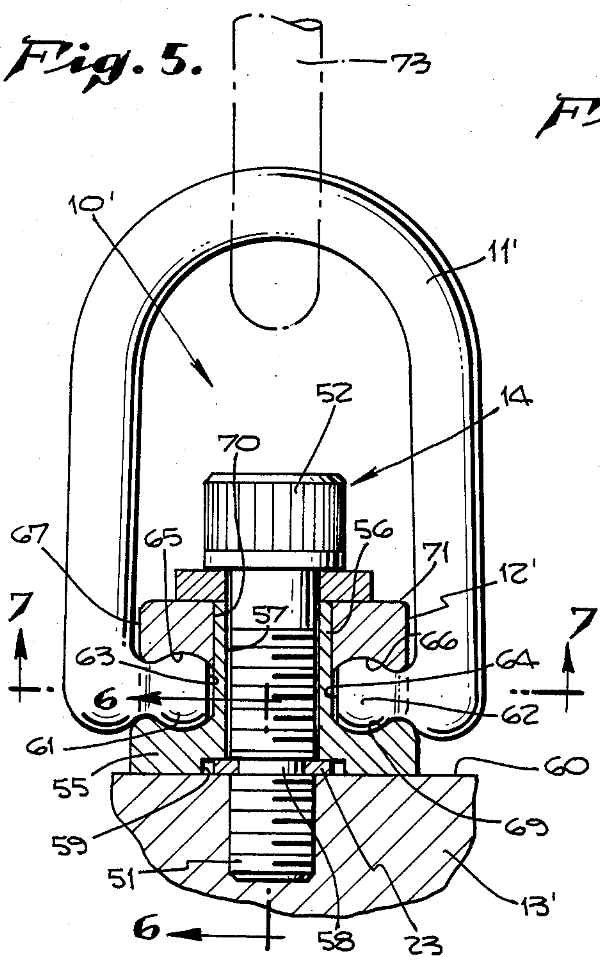
FIG. 5 is a side elevational view of a second form of the multi-position eyebolt shown mounted on a load.

In one embodiment of the eyebolt chosen for the purpose of illustration, there is shown what may aptly be described as a multi-position fixture consisting of a load-engaging anchor assembly, indicated generally by the reference character 10, upon which a ring member 11 is mounted and contained by use of a bonnet 12 in a fashion such that the ring member can pivot throughout a vertical arc of 180 degrees, as viewed in FIG. 1. At the same time the bonnet, and consequently the ring member, can swivel in a horizontal plane throughout a full 360 degrees. Merely by way of example the load-engaging anchor assembly is shown embedded in and anchored to a load 13 which can be a mass of metal adapted to attachment of a stud or mounting screw.

The load-engaging anchor assembly 10 previously made reference to consists in part of the stud 14, the lower portion of which consists of a threaded shank 15, the upper end being provided with a head 16. To assist in tightening and loosening the stud from position, the exterior of the head may be knurled, as shown in FIGS. 1, 2 and 4, and also provided with a hexagonal recess 17 for reception of an appropriate conventional hexagonal wrench.

For cooperation with the stud 14, there is provided a bushing 18. For engagement with the load, the bushing is provided with an annular bearing flange 19. Extending outwardly from the bearing flange is a sleeve 20, the bearing flange and sleeve 20 being provided with a central bore 21 through which the threaded shank 15 of the stud 14 extends.

The bonnet 12, previously identified, extends around the sleeve 20 and is held in position by a retaining washer 22 beneath the head 16.

At the end of the sleeve 20 opposite from the washer 22 is a clip in the form of an E-ring 23 lodged in an annular groove 24 in the threaded shank 15. A recess 25 on the underside of the bearing flange 19 accommodates the retaining clip in a position where it can clear an adjacent surface 26 of the load 13. By providing the retaining clip 23 as described, the operating parts are held in the necessary assembled relationship during shipment and handling, prior to being anchored to the load, the parts, therefore, not being easily mislaid.

Should there be need to disassemble the parts of the load-engaging anchor assembly, the retaining clip 23 provided with an open side 27 as shown in the exploded view, FIG. 4, can be expanded and removed.

The ring member 11, frequently identified as a hoist ring, eyebolt, or U-bar, in order to provide an adequate safety factor, is preferably of forged steel. As a U-bar, pivot pins 30 and 31 are forged simultaneously with the forging of the ring member, and at the open end of the ring member. Radially inwardly directed end faces 32 and 33 of the respective pins 30 and 31 are spaced from each other a distance something in excess of the outside diameter of the sleeve 20. For holding the pivot pins in operative position, the bonnet 12 is provided with diametrically opposite bearing recesses 34 and 35 in a side wall 36, the bearing recesses having a breadth slightly in excess of the diameter of the pivot pins so that the pins are adapted to pivot freely within the recesses, the pins and recesses being in axial alignment.

Of special concern is the frusto-conical shape of pivot pins 30 and 31, the section of larger diameter being at the free end and the section of smaller diameter being at the captive end. To receive the frusto-conical pins each of the bearing recesses 34 and 35 has a complementary frusto-conical form applicable to one side of the pin. For the other side of the pin the bearing flange 19 is provided with an annular depression 37, deeper at the inner circumference adjacent the sleeve 20 than at the outer circumference.

When assembling the parts, the pivot pins of frusto-conical form are confined between the bearing recesses 34, 35 and the depression 37 of the bearing flange 19. The pins are thus, in effect, locked in place. This locking in place is a materially effective means for preventing spreading of the sides of the ring member 11 irrespective of the force exerted upon it by a tie or the direction of the force.

So that the bonnet can swivel freely about the sleeve 20, there is provided a central aperture 40 extending inwardly from an end wall 41 and of diameter slightly in excess of the outside diameter of the sleeve 20. It is also of consequence to note that the length of the sleeve 20 is something in excess of the height of the side wall 36 so that the bearing flange 19 cannot be drawn into binding engagement with the bonnet when the stud 14 draws the bearing flange 19 snugly against the surface 26 of the load 13. With this arrangement the bonnet remains free to swivel its full 360 degrees, enabling the ring member 11 likewise to swivel the full 360 degrees, while at the same time being capable of pivoting about the axis of the pivot pins 30 and 31.

Although the load has been identified as a mass of metal, it should be appreciated that the shank of the stud can be as readily embedded in concrete or fastened in some other conventional manner to items such as large dies and fixtures, heavy machinery and structural members. The hoist ring assembly or swivel eyebolt, for such it is, can be as readily attached to mobile equipment, cargo slings, or virtually any kind of load which needs to be either lifted or to be tied in place.

In a second embodiment of the eyebolt shown in FIGS. 5 through 8, the multi-position fixture consisting of a load-engaging anchor assembly is indicated generally by the reference character 10', upon which a ring member 11' is mounted and contained by use of a bonnet 12' in a fashion enabling the ring member to pivot throughout a vertical arc of 180 degrees. As in the first embodiment, the bonnet, and consequently the ring member, can swivel horizontally throughout a full 360 degrees. Again by way of example, the load-engaging anchor assembly 10' is shown embedded in an anchored to a load 13' which can be a mass of metal adapted to attachment of a stud or mounting screw 14'.

Figure 8:
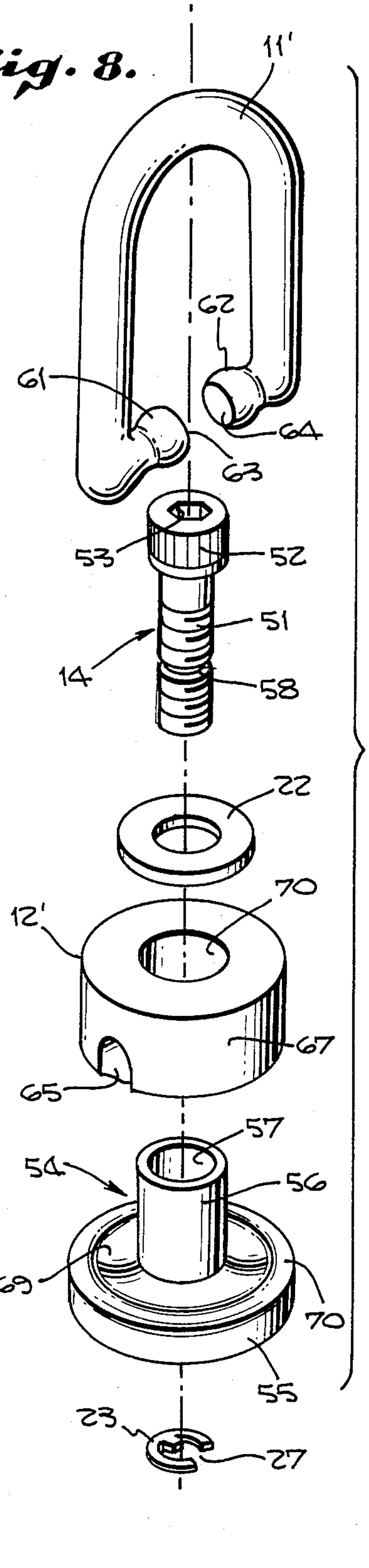
FIG. 8 is an elevational exploded view of parts of the multi-position eyebolt of FIG. 5.
Figure 6:
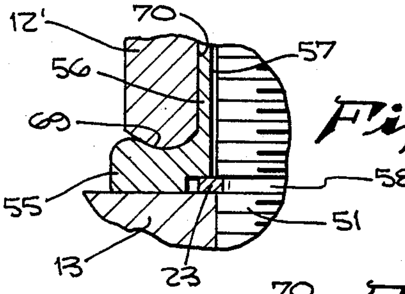
FIG. 6 is a fragmentary sectional view on the line 6—6 of FIG. 5.
Figure 7:
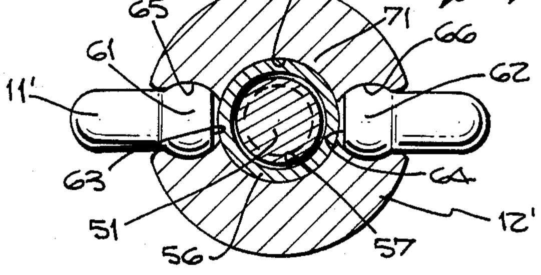
FIG. 7 is a cross-sectional view on the line 7—7 of FIG. 5.

The load-engaging anchor assembly 10' consists in part of the stud 14', the lower portion of which consists of a threaded shank 51, the upper end being provided with a head 52. To assist in tightening and loosening the stud from position, the exterior of this head also may be knurled, as shown in FIGS. 5 and 8, and also provided with a hexagonal recess 53 for reception of an appropriate conventional hexagonal wrench.

For cooperation with the stud 14', there is provided a bushing 54. For engagement with the load, the bushing is provided with an annular bearing flange 55. Extending outwardly from the bearing flange is a sleeve 56, the bearing flange 55 and sleeve 56 bearing provided with a central bore 57 through which the threaded shank 51 of the stud 14' extends.

The bonnet 12', previously identified, extends around the sleeve 56 and is held in position by the washer 22 beneath the head 52.

At the end of the sleeve 56 opposite from the washer 22 is the clip 23 in the form of an E-ring lodged in an annular groove 58 in the threaded shank 51. A recess 59 on the underside of the bearing flange 55 accommodates the retaining clip in a position where it can clear an adjacent surface 60 of the load 13'. By providing the retaining clip 23 and as already described, the operating parts are held in the necessary assembled relationship during shipment and handling, prior to being anchored to the load, the parts, therefore not being easily mislaid.

Wherever there is need to disassemble the parts of the load-engaging anchor assembly, the retaining clip 23, provided as shown with an open side 27, as shown in the exploded view, FIG. 8, can be expanded and removed.

The ring member 11', again in order to provide an adequate safety factor, is preferably of forged steel. Pivot pins 61 and 62 are forged simultaneously with the forging of the ring member, and at the open end of the ring member. Radially inwardly directed end faces 63 and 64 of the respective pins 61 and 62 are spaced from each other a distance something in excess of the outside diameter of the sleeve 56. For holding the pivot pins in operative position, the bonnet 12' is provided with diametrically opposite spherical bearing pocket recesses 65 and 66 in a side wall 67. The pocket recesses have a depth slightly in excess of the spherical knobs of the pins 61 and 62 so that the pins are adapted to pivot freely within the pocket recesses, the pins and recesses being in axial alignment.

Here also of special concern is the spherical shape of pivot pins 61 and 62, the section of larger diameter being at the free end and the section of smaller diameter being at the captive end. On this occasion the bearing flange 55 is provided with an annular recess 69 inwardly relative to an annular ridge 70. The annular recess 69 serves as a receptical for the sides of the spherical knobs of the pivot pins 61 and 62.

When in assembling the parts, the spherical knobs of the pivot pins 61 and 62 are confined between the pocket recesses 65 and 66 on the one side and the annular recess 69 on the other side, the pins 61 and 62 here also are locked in place as an effective way to prevent spreading of the free ends of the ring member 11 should the eyebolt be overloaded or the material of the ring member not be sufficiently resistant to yielding.

Here also, to have the bonnet swivel freely about the sleeve, there is provided a central aperture 70 inwardly of an end wall 71 slightly in excess of the outside diameter of the sleeve 56. It is again of consequence to note that the length of the sleeve 56 is something in excess of the height of the side wall 67 so that the bearing flange 55 cannot be drawn into binding engagement with the bonnet when the stud 14' draws the bearing flange 55 snugly against the surface 60 of the load 13'. With this arrangement the bonnet as previously noted remains free to swivel its full 360 degrees, enabling the ring member 11' likewise to swivel the full 360 degrees, while at the same time being capable of pivoting about the axis of the pivot pins 61 and 62 when force is exerted, for example, by a tie 73.

While particular embodiments of the invention have been shown and described, it will be obvious to those skilled in the art that changes and modifications may be made without departing from the invention in its broader aspects, and therefore the aim of its appended claims is to cover all such changes and modifications as fall within the true spirit and scope of the invention.

Having described the invention, what is claimed as new in support of Letters Patent is as follows:

1. A multi-position fixture for fixed attachment to a load comprising a load-engaging anchor assembly having an annular outwardly facing portion, a bonnet having a swivel engagement with the outwardly facing portion of the anchor assembly and adapted to rotate throughout substantially a full circle, recess means in said bonnet, a homogeneous substantially arcuate ring member, said ring member comprising a loop with a transversely disposed integral pivot pin structure having opposite elements in a fixed spaced axial relationship with respect to each other, each said element having a captive end at a junction with the loop and a free expanded end larger in cross-sectional configuration than the corresponding captive end, said recess means comprising a bearing pocket on respective diametrically opposite sides of the bonnet, each bearing pocket having a form and size complementary with respect to the corresponding element of the pivot pin structure whereby in operation the pivot pin structure is adapted to occupy a locked-in location between the bonnet and the load-engaging anchor during movement of said ring member throughout an arc of substantially a half circle for all positions of rotation of said bonnet.

2. A multi-position fixture as in claim 1 wherein that portion of the expanded end which is received in the bearing pocket is substantially spherical in form.

3. A multi-position fixture as in claim 1 wherein that portion of the expanded end which is received in the bearing pocket is substantially frusto-conical in form.

4. A multi-position fixture as in claim 1 wherein there is a bushing between the bonnet and the load and a portion of the bushing facing the bonnet includes at least a portion of bearing pocket.

5. A multi-position fixture for fixed attachment to a load comprising a stud having at one end a shank for engagement with the load and a retention head at the other end, a bushing on the stud, said bushing having a bearing flange at one end for bearing engagement with the load and a sleeve at the other end, a bonnet having an end wall with a central aperture for engagement over said shank and beneath said head, an annular side wall structure for the bonnet having an outer end at the perimeter of the end wall and an inner end extending around said shank, said bonnet having a rotatable mounting on said stud, a substantially arcuate ring member fixed in shape having an outer loop, a portion of the material of said ring member remote from said loop comprising opposite integral, imperforate and radially inwardly directed pivot pins in axial alignment, free ends of said pivot pins having initially fixed positions spaced from each other at a distance no less than the diameter of said sleeve, said free ends being larger than captive ends of the pivot pins, and oppositely disposed bearing pockets in said side wall structure complementary in shape to the free ends of the respective pivot pins, each having an opening at the side facing said bearing flange, respective pivot pins being pivotally received in the corresponding pocket and comprising means for pivotal retention of said ring member in equal load retaining relationship in all positions of rotation.

6. A multi-position fixture as in claim 5 wherein said sleeve is located between free ends of the pivot pins and comprises means for supporting the bonnet between the head of the shank and the bearing flange.

7. A multi-position fixture for fixed attachment to a base, said fixture comprising a base-engaging anchor assembly, respective outer and inner interlock members having potential axial movement relative to each other to interlock positions, at least one of said interlock members having an operative swivel engagement with the anchor assembly and adapted to rotate throughout substantially a full circle, a ring member comprising a loop and a transversely disposed pivot pin structure having opposite elements respectively joined to said loop in a spaced relatively axial relationship with respect to each other, each said element having a captive relatively smaller end at a junction with the loop and a free relatively larger end, said interlock members including complementary retention means on respective diametrically opposite sides of the fixture, each said complementary retention means having opposite pin retention portions movable relative to each other to interlock engagement with the pivot pin structure whereby in operation the pivot pin structure is adapted to occupy a locked-in location between said interlock members during movement of said ring member throughout an arc of substantially a half circle for all full circle positions of rotation of said outer interlock member.

* * * * *